United States Patent [19]

Okado et al.

[11] Patent Number: 4,562,813
[45] Date of Patent: Jan. 7, 1986

[54] KNOCK CONTROL SYSTEM

[75] Inventors: Terumi Okado, Katsuta; Seiji Suda; Noboru Sugiura, both of Mito; Takashi Yoshinari, Katsuta; Hitoshi Minorikawa, Mito; Kazutoshi Kobayashi; Hiroshi Fujiwara, both of Katsuta, all of Japan

[73] Assignee: Hitachi, Ltd., Tokyo, Japan

[21] Appl. No.: 556,118

[22] Filed: Nov. 29, 1983

[30] Foreign Application Priority Data

Nov. 29, 1982 [JP] Japan ................................ 57-207681

[51] Int. Cl.4 ................................................. F02P 5/14
[52] U.S. Cl. ........................................ 123/425; 73/35; 123/647
[58] Field of Search ................. 123/425, 647, 146.5 A; 73/35

[56] References Cited

U.S. PATENT DOCUMENTS 3,888,225  6/1975  Boyer et al. ................. 123/635 X
4,106,447  8/1978  West ............................. 123/425
4,224,917  9/1980  Nakazawa et al. ............ 123/647
4,343,285  8/1982  Brammer ...................... 123/647
4,446,724  5/1984  Focht ........................ 123/494 X Primary Examiner—Tony M. Argenbright
Attorney, Agent, or Firm—Antonelli, Terry & Wands

[57] ABSTRACT

A knock control system which includes a knock control unit constructed of a transducer portion for detecting vibrations of an engine and converting the detected vibrations into an electric signal, and a knock signal processing unit for delivering a signal indicative of the occurrence of a knock in dependence upon a receipt of the knock signal from the transducer portion. The knock signal processing circuit controls the ignition timing of the internal combustion engine on the basis of the knock signal from the knock control unit. At least one of the transducer portion and the knock signal processing circuit unit of the knock control system is mounted on a portion of a distributor which has a fixing base portion at a part of the housing thereof.

6 Claims, 16 Drawing Figures

KNOCK CONTROL SYSTEM

BACKGROUND OF THE INVENTION

The present invention relates to a distributor for an electric ignition system of an internal combustion engine and, more particularly, to a distributor for an internal combustion engine having a knock control system.

With increased concern for energy conservation, considerable attention has been devoted to the enhancement of engine performance, by, for example, installation of a supercharger, etc. Moreover, there has been considerable concern for controlling an operation of the internal combustion engine in an operational area of a limit point near to a knock causing condition in gasoline engines, especially engines for motor vehicles. Consequently, a realiable control of engine knocking, hereinafter referred to simply as "knock" has come into the limelight as an indispensable control arrangement.

Presently, systems for the control of engine knock function in such a manner that, upon detecting a particular vibration which develops in the engine upon the occurrence of a knock, the ignition is retarded to thereby suppress the knock at the initial stage of the occurrence thereof. Systems of this type are generally designated a "knock control system".

As apparent from the foregoing, a knock control system requires a transducer or a so-called knock sensor for sensing vibrations of the engine and converting the sensed vibrations into electrical signals, with a signal processing circuit being provided for properly the electric signals derived by the knock sensor in generating a so-called knock signal at the occurrence of a knock in the engine.

Ignition systems with a knock control arrangement have been proposed wherein the ignition timing is delayed as soon as the knock has occurred in the engine and a delay of the timing is gradually increased when the knock continues. Due to this operation, an engine knock can be effectively suppressed and the overall performance of the engine or the effects of a supercharger can be greatly enhanced and efficiently promoted.

In proposed knock control systems, a knock sensor and a knock control circuit unit are provided for processing the signal produced by the knock sensor. Conventionally, with the knock sensor has been mounted directly on the engine block while the knock control circuit unit is mounted at a different location within the engine compartment.

A disadvantage of proposed knock control systems resides in the fact that such systems require the step of mounting the knock sensor and a separate step of mounting the knock control circuit unit in addition to the step of wiring the sensor and control circuit to each other during the course of assemblying the engine.

A further disadvantage of proposed knock control system resides in the fact that an additional space is required for mounting not only the knock control sensor but also the knock control circuit connected thereto.

The aim underlying the present invention essentially resides in providing a knock control system which facilitates the mounting of the knock control system and the wiring thereof during an assembly of the engine and which also dispenses with the need for providing an additional space to accommodate portions of the knock control system.

In accordance with advantageous features of the present invention, at least one of a knock sensor or a signal processing circuit unit therefor is mounted on a distributor of the engine.

Advantageously, in accordance with further features of the present invention, at least the transducer forming the sensor of the knock control system and/or the signal processing circuit unit is mounted inside of a fixing base portion of the distributor.

Preferably, the signal processing circuit unit is constructed as a unit with the ignition control circuit unit and, the distributor is fashioned as a distributor having an ignition coil unitary therewith.

Accordingly, it is an object of the present invention to provide a knock control system for an internal combustion engine which avoids, by simple means, shortcomings and disadvantages encountered in the prior art.

Another object of the present invention resides in providing a knock control system for an internal combustion engine which is simple in construction and therefore relatively inexpensive to manufacture.

A further object of the present invention resides in providing a knock control system which functions reliably under all operating conditions of the engine.

Yet another object of the present invention resides in providing a knock control system an installation of which can be completed partly or almost fully by a mounting of the distributor.

A still further object of the present invention resides in providing a knock control system which enables a reduction in a cost necessary for assemblying of the internal combustion engine as well as a reduction in the space necessary for attachment of the knock control system to the engine.

Another object of the present invention resides in providing a knock control system which assures a highly realiable operation and which sharply curtails the cost of the equipment necessary for the system.

These and other objects, features, and advantages of the present invention will become more apparent from the following description when taken in connection with the accompanying drawings which show, for the purposes of illustration only, several embodiments in accordance with the present invention.

DETAILED DESCRIPTION

Figure 1:
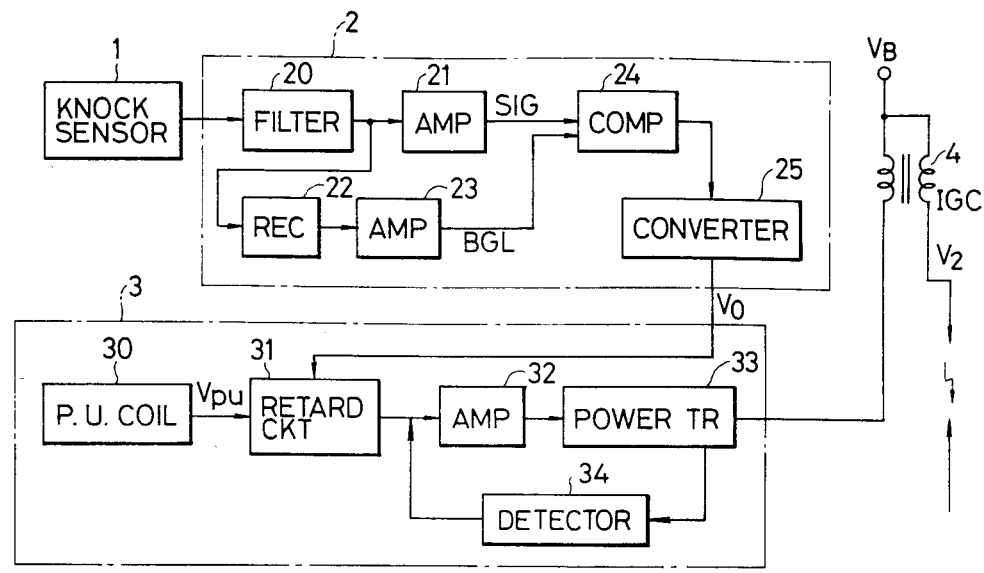
FIG. 1 is a block diagram of a prior art control system.

Referring now to the drawings wherein like reference numerals are used throughout the various views to designate like parts and, more particularly, to FIG. 1, according to this figure, a prior art ignition system equipped with a knock control system includes a knock sensor 1, a knock control circuit 2, and an ignition control device or igniter 3 which functions to control the supply of current to an ignition coil 4.

Figure 2:
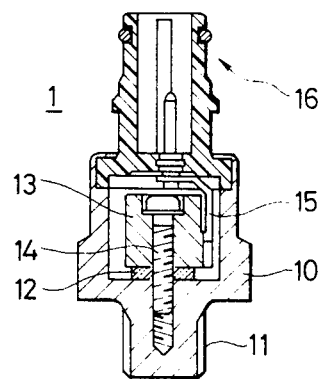
FIG. 2 is a longitudinal cross sectional view of a prior art piezoelectric knock sensor.

The knock sensor 1 is an acceleration detector, for example, maybe a piezoelectric type, an electromagnetic type, etc. As shown in FIG. 2, a piezoelectric type knock sensor 1 includes a body 10, a fitting thread portion 11, a piezoelectric element 12, a weight 13, a clamping fastener or screw 14, a lead wire 15, and a terminal portion generally designated by the reference numeral 16. The piezoelectric element 12 is fashioned as a ring-shaped disc of a barium titanate ceramic or the like and is formed with electrodes on upper and lower surfaces thereof. The piezoelectric element 12 and the ring-shaped weight 13, made of a suitable metallic material or the like, are stacked and locked by the fastener 14, with the lead wire 15 functioning to connect the upper electrode of the piezoelectric element 12 to the terminal portion 16. The so fabricated knock sensor 1 is adapted to have its fitting threaded portion 11 rigidly mounted in a female threaded hole provided at a predetermined position of a block of an internal combustion engine (not shown).

With a knock sensor 1 constructed as described hereinabove, when the engine vibrates to exert a longitudinal acceleration of a knock sensor 1, a pressure applied to the piezoelectric element 12 under the action of the ring-shaped weight 13 varies so that an electric signal indicative of the vibrations of the engine block can be derived from the terminal portion 16.

Figure 3:
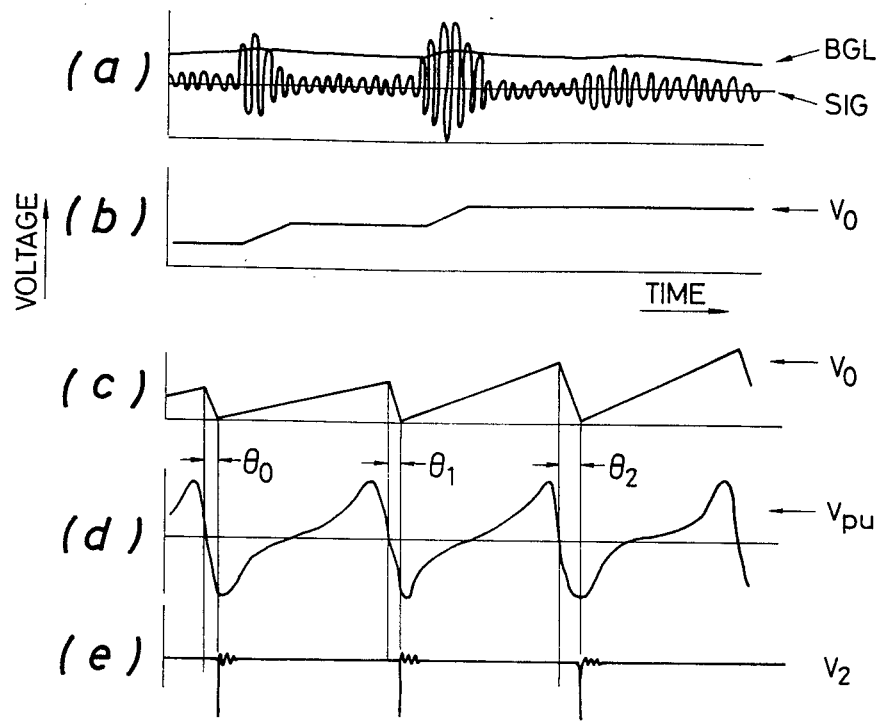
FIGS. 3(a)–3(e) are waveform diagrams of the prior art knock control system.

The knock control circuit 2 generates a knock signal $B_o$ by processing the signal delivered from the knock sensor 1, and only a signal of a vibration frequency ban characteristic of the engine knock is discriminated from the output of the knock sensor 1 and then emphasized and derived by means of the filter 20. On the one hand, the signal is amplified to a predetermined level by an amplifier 21 so as to obtain a signal SIG which is supplied to the comparison input of a comparator 24. On the other hand, the signal is averaged by a half-wave rectifier 22 and an amplifier 23 into a signal BGL supplied to the reference input of the comparator 24. Thus, only when the level of the signal SIG has exceeded that of the signal BGL, an output is provided by the comparator 24. When the comparator 24 has produced the output, a knock voltage converter circuit 25 decides whether an engine knock has occurred and functions so as to raise the knock signal $V_o$. Accordingly, the signals SIG, BGL and the knock signal $V_o$ in or from the knock control circuit take the form illustrated in FIGS. 3(a) and 3(b) respectively.

As also shown in FIG. 1, the igniter 3 is of a so-called built-in type which is constructed as a unit with a pickup coil 30 for detecting a reference crank angle position of the engine. The igniter 3 also includes a phase control circuit or "retard circuit" 31 which is adapted to generate a delay signal for retarding the ignition timing from a predetermined point in accordance with the knock signal $V_o$, an amplifier 32, a power transistor 33 for controlling the current supplied to the ignition coil 4, and a saturation time detector circuit 34 adapted to control the conduction time of the power transistor 33 so as not to exceed a predetermined value. The phase control circuit 31 includes a capacitor which is charged and discharged by a constant current charging circuit and a constant current discharging circuit, with the timing at which the charge of the capacitor changes over to the discharge thereof being controlled by a signal $V_{pu}$ supplied from the pickup coil 30, while the charging current value of the constant current charging circuit is controlled by the knock signal $V_o$. When, for example, the terminal voltage of the capacitor of the phase control circuit 31 has reached a predetermined value, an ignition signal is generated and, consequently, a terminal voltage $V_\theta$ of the capacitor included in the retard circuit 31, the signal $V_{pu}$ detected by the pickup coil 30, and the secondary voltage $V_2$ of the ignition coil 4 take the form illustrated in FIGS. 3(c)–3(e), respectively, and the ignition timing is successively retarded as indicated by the reference characters $\theta_o$, $\theta_1$, and $\theta_2$ from predetermined points in accordance with the magnitude of the knock signal $V_o$.

While the igniter 3 has been described as being constructed as a unitary construction built in with the pickup coil 30, as readily apparent, it is also possible for the igniter 3 to have the pickup coil 30 constructed separately from the other circuitry.

Figure 4:
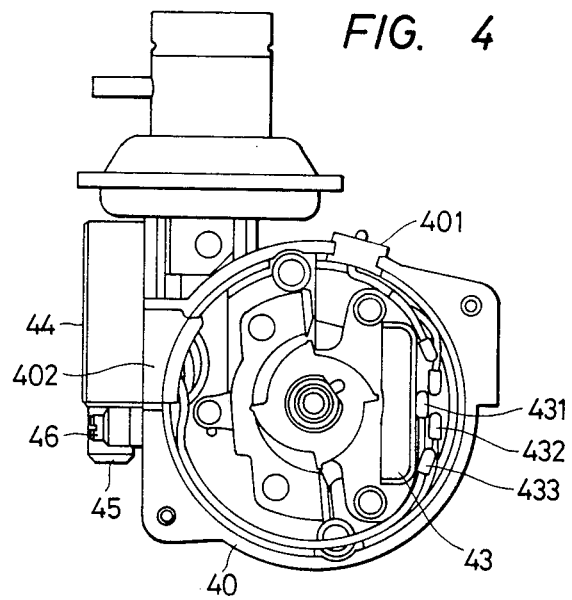
FIG. 4 is a top view of a distributor, with a distributor cap thereof removed, with a first embodiment of a knock control system in accordance with the present invention.
Figure 5:
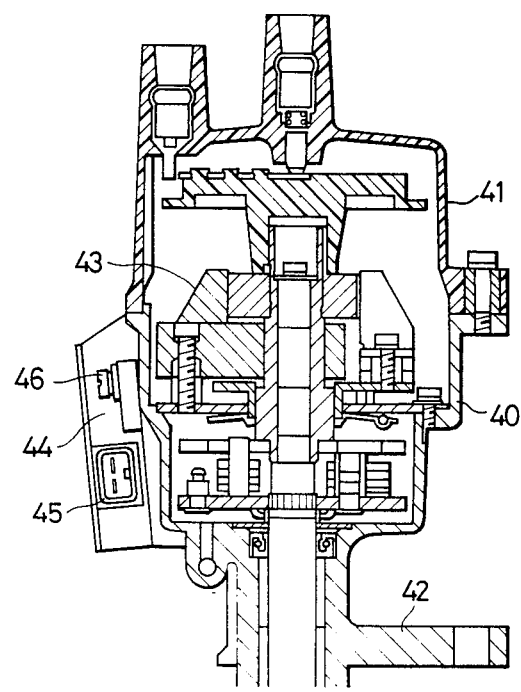
FIG. 5 is a lateral cross sectional view of the distributor of FIG. 4.

As shown in FIGS. 4 and 5, the knock control system of the present invention is associated with a distributed which includes a distributor body 40, a distributor cap 41, and a mounting and fixing base portion 42, formed as a unit with the body 40, an igniter unit 43, a knock control circuit unit 44, hereinafter referred to as a "knock C/U", a terminal portion 45, and a fitting fastener or screw member 46.

The distributor of FIGS. 4 and 5 is an ordinary distributor wherein the body 40 accommodates a reluctor for the igniter, a rotor for distributing a high voltage, a centrifugal governor, a vacuum angle advancer, etc., with the igniter unit 43 being of the so-called full transistor type. The distributor is adapted to be mounted on a block of the engine by the base portion 42, with the body 40 being provided with a terminal portion 401 for enabling connection with an external power source as well as an ignition coil, and a terminal portion 402 for the knock C/U 44. In addition to ordinary terminals, the igniter unit 43 is provided with terminals 431, 432, 433 for enabling a connection with the knock C/U 44 with these terminals being connected through the terminal portion 402.

Figure 6:
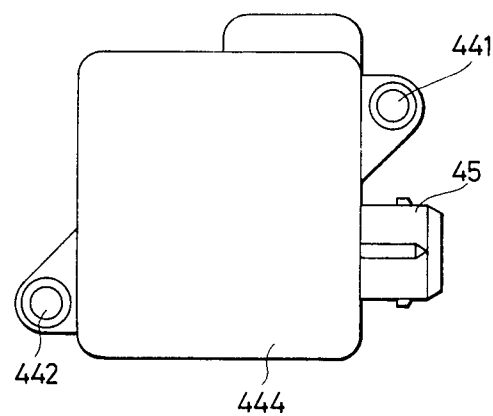
FIG. 6 is a front view of a knock control circuit unit for a knock control system constructed in accordance with the present invention.
Figure 7:
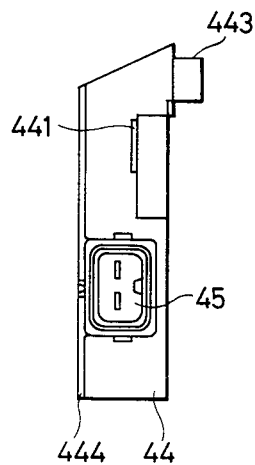
FIG. 7 is a side view of the knock control circuit unit of FIG. 6.
Figure 8:
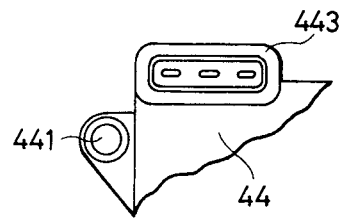
FIG. 8 is a partial rear view of a terminal portion of the knock control circuit unit of FIG. 6.

As shown in FIGS. 6-8, the knock C/U 44 includes mounting openings 441, 442 adapted to receive fitting fasteners such as screws of the like, a terminal portion 443, and a cover 444. Preferably, the knock C/U 44 is formed by a molding process and accommodates therein a knock control circuit (FIG. 1) in an IC implementation. The knock C/U 44 is provided with a terminal portion 45 for enabling a connection with the knock sensor 1, and a terminal portion 443 for enabling a connection with the igniter unit 43. The knock C/U 44 is adapted to be attached to the body 40 of the distributor by two fasteners such as screws 46, only one of which is shown in the drawings, and is connected with the igniter unit 43 in such a manner that the terminal portion 443 is inserted in and coupled with the terminal portion 402. The three terminals 431, 432, 433 are disposed between the knock C/U 44 and the igniter unit 43 since, in addition to the power source and knock signal $V_o$, a signal expressing an ignition timing is sent from the igniter 43 to the knock C/U 44.

Although not shown in FIG. 1, the signal expressive of the ignition timing is required in the knock C/U 44 since the signal from the knock sensor 1 is a signal of a considerably minute level whereas noise attendant upon ignition reaches a considerably high level. Therefore, at the ignition timing the signal is masked so as not to receive the ignition noise thereby enabling a realiable detection of the signal from the knock sensor 1.

In accordance with the embodiment described hereinabove, by merely attaching the distributor to the block of the engine, the mounting of the knock C/U 44 of the knock control system is automatically completed and the wiring between the knock C/U 44 and the igniter unit 43 is dispensed with. The installation of the knock control system is effected by merely mounting the knock sensor 1 and carrying out the wiring therefrom the knock C/U 44 thereby greatly simplifying the assembling process of the knock control system to the internal combustion engine.

Figure 9:
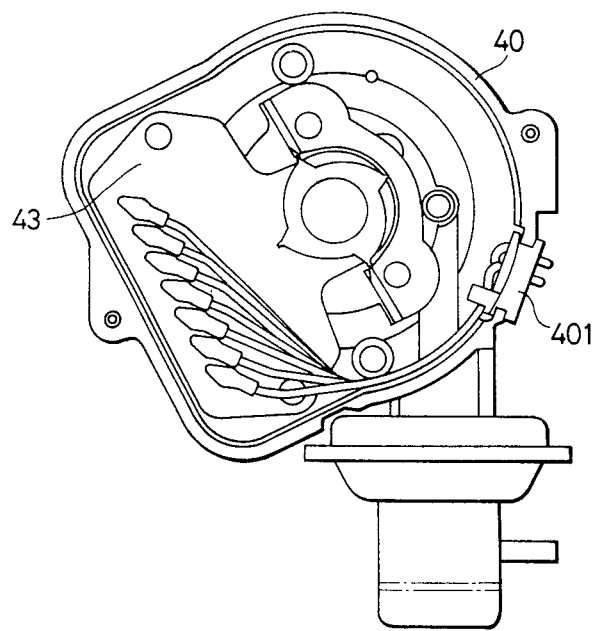
FIG. 9 is a top view of another embodiment of a distributor of a knock control system constructed in accordance with the present invention.
Figure 10:
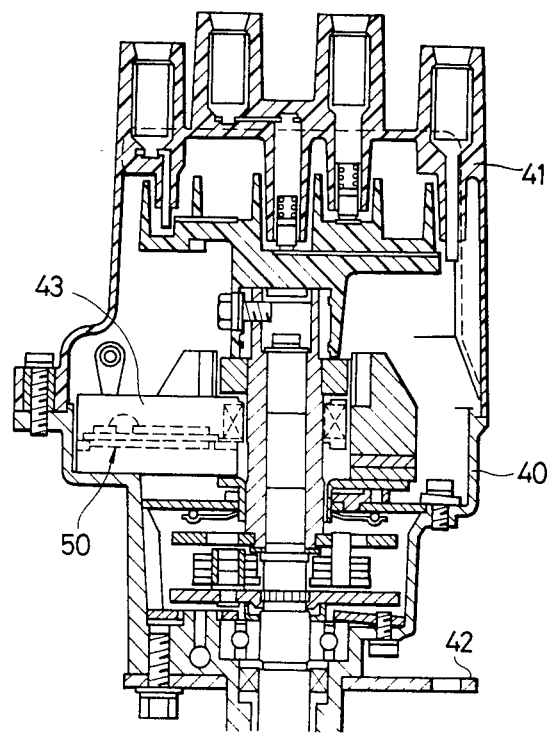
FIG. 10 is a side cross sectional view of the distributor of FIG. 9.
Figure 11:
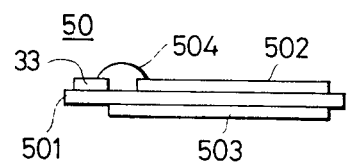
FIG. 11 is a side view of an IC unit for a knock control system constructed in accordance with the present invention.

As shown in FIGS. 9 and 10, it is possible for the knock C/U 44 to be built into the igniter unit 43 with the IC unit generally being designated by the reference numeral 50. As shown in FIG. 11, the IC unit 50 is fashioned so that ceramic IC substrates 502, 503 are disposed on both surfaces of a metal plate 501 of, for example copper or the like, which serves both as a shield plate and a thermal diffusion plate with the IC unit 50 also including a power transistor 33. The IC substrate 502 and the power transistor 33 are connected by, for example, a wire bonding 504. In all other respects, the embodiment of FIGS. 9-11 correspond to the embodiment described hereinabove in connection with FIGS. 4 and 5 with the exception of the differences relating to the specification of the distributor, etc.

The ceramic IC substrate 502 bounded on one surface of the metal plate 501 is, for example, formed with the retard circuit 31, amplifier 32, and saturation time detector circuit 34 of the igniter 3 shown in FIG. 1, while the ceramic IC substrate 503 mounted on the other surface of the metal plate 501 is, for example, formed with the knock control circuit 2 in FIG. 1. The power transistor 33, disposed on one surface of the metal plate 501, is, of course, the same as the power transistor 33 included in the igniter 3 in FIG. 1.

Thus, according to the embodiment of the present invention illustrated in FIGS. 9-11, at the point in time at which, in assemblying the distributor, the igniter unit 43 has been mounted in the body 40 thereof, the mounting of the knock C/U 44 and the wiring between the knock C/U 44 and the igniter unit 43 are simultaneously completed. By merely attaching the distributor body 40 to the engine block through the base portion 42, the mounting and wiring of the knock C/U 44 can be automatically completed.

By virtue of the constructional features of the embodiment illustrated in FIGS. 9-11, the processes necessary for mounting of the knock C/U 44 on the body 40 of the distributor in the embodiment of FIGS. 4 and 5 can be dispensed with and, additionally, the terminal portions 45, 402, and the terminals 431, 432, 433 as well as the wiring between them may be dispensed with so that there is a considerable reduction in the overall cost, as well as an increase in the realiability due to the reduced number of constituent elements necessary for the knock control system.

Figure 12:
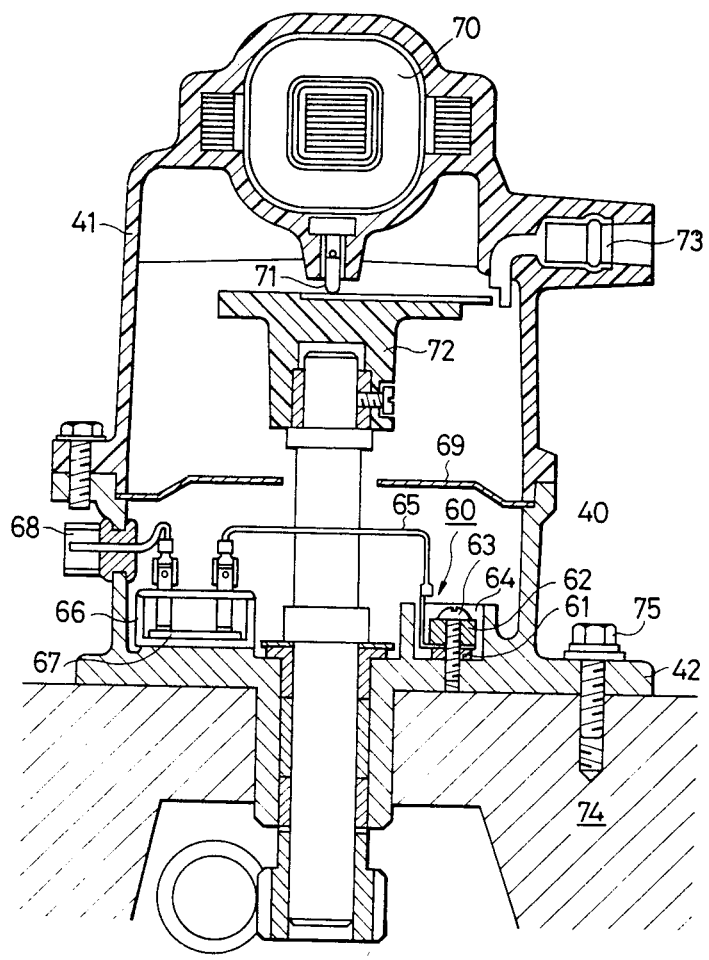
FIG. 12 is a cross sectional view of yet another embodiment of a distributor for a knock control system of the present invention.

As shown in FIG. 12, it is also possible in accordance with the present invention, to provide a knock control system which includes a knock sensor generally designated by the reference numeral 60, a piezoelectric element 61, a weight 62, a fastening means 63 such as, for example, a screw or the like, a recess 64, a lead wire 65, a knock CU 66, an IC substrate 67, a terminal portion 68, a shield plate 69, an ignition coil 70, a carbon chip 71, a rotor 72, and a high voltage terminal 73, with the knock control system being adapted to be mounted on an engine block 74 by way of an anchoring means such as, for example, a bolt 75 of the like.

Advantageously, the knock sensor 60 is of a piezoelectric type similar to the knock sensor illustrated in FIG. 2; however, the knock sensor 60 is not fabricated into a unit assembled in the body 10 as with the knock sensor of FIG. 2 but is so constructed that the piezoelectric element 61 and the weight 62, fashioned as ring shaped discs, are directly mounted by the fitting fastener 63 in the recess 64 formed in an inner upper surface of the base portion 42 of the distributor body 40. In order to prevent an intrusion of moisture or the like into the recess 64, a gel-like filler material may be inserted in the recess 64 after assembling of the knock sensor 60.

As shown in FIG. 12, the knock C/U 66 is similarly disposed on an inner upper surface of the base portion 42 in an area of the knock sensor 60 and is so mounted that the IC substrate 67 touches or contacts the upper surface of the base portion 42 in parallel therewith. The knock C/U 66 is connected with the knock sensor 60 through the short lead wires 65 and is further connected with an external power source, etc., through the terminal portion 68. The shield plate 69 is arranged so as to substantially bisect an interior of the distributor into upper and lower parts thereby functioning to maintain, in a shielded state, an inner lower part of the distributor in which the knock sensor 60, the knock C/U 66, etc. are disposed.

The ignition coil 70 is, preferably, of a so-called closed magnetic path type and is furnished with a magnetic path similar to that of a shell type transformer. Advantageously, the ignition coil 70 is unitarily molded in the upper portion of the cap 41 of the distributor, with a high voltage output being directly connected to the carbon chip 71 and distributed from the rotor 72 to the high voltage terminal 73 similar to previously proposed distributors having a unitary ignition coil.

As shown in FIG. 12, the distributor assembled with the knock sensor 60 and the knock C/U 66 is mounted on the engine by the anchor bolt 75 in such a manner that the base portion 42 lies in direct contact with the engine block 74. Thus, vibrations developing in the engine are transmitted from the engine block 74 to the base portion 42 of the distributor without any appreciable change and the vibrations are detected by the knock sensor 60. When an engine knocking condition occurs in the engine, a signal output containing an electric signal based thereon is produced by the knock sensor 60 and a knock signal delivered from the knock C/U 66 is provided from the terminal portion 68 thereby enabling the carrying out of a knock control.

The knock control system of FIG. 12 is readily applicable to an engine of the type in which the ignition system is digitally controlled by a microcomputer or the like so that the knock signal is taken out of the distributor. However, both the igniter and the knock C/U 66 may well be built in the distributor as in the embodiment of FIGS. 9 and 10. In this situation, the knock signal from the knock C/U 66 is directly used for the control of an ignition timing inside of the distributor and need not be taken outside. With an ignition system of the so-called analog type employing an igniter, equipment such as a centrifugal governor and a vacuum angle advance are, of course, disposed as needed in a conventional manner not shown in FIG. 12.

In accordance with the embodiment of FIG. 12, the knock control system is wholly built into the distributor; therefore, the installation of the knock control system is completed merely by mounting the distributor on the engine block during an assemblying of the engine and any other processing is not required for the installation of the knock control system so that considerable improvements or advantages are realized with respect to both the cost and installation space of the knock control system.

Additionally, by virtue of the provision of the shield plate 69 in the manner described hereinabove, the knock sensor 60 and the knock C/U 66 including the lead wire 65 connecting them, are disposed in a substantially perfect shielded state due not only to the shield plate but also the distributor body 40 so that any danger of noise or interference mixing with the output of the knock sensor 60 is minimized if not avoided. Moreover, the lead wire 65 may be very short and need not be a shielding wire of the like so that the level fluctuation or the signal-to-noise ratio SN lowering of the signal expressing or indicative of the knock vibrations as produced by the knock sensor 60 is hardly involved thereby ensuring that a detecting operation can be carried out sufficiently realiably. To realize even a further reduction in the overall cost, the knock sensor 60 need not be constructed into a unit as shown in FIG. 2 but rather the assembly may consist of the piezoelectric element 61 and the weight 62.

Since the embodiment of FIG. 12 is of the type having the built-in ignition coil, most of the ignition system including the knock control system can be completed by merely mounted the distributor so as to sharply simplify the overall assembly process of the engine in addition to reducing the installation space required. This is especially significant in engines having an analog ignition system. Furthermore, with the embodiment of FIG. 12, the output signal from the knock sensor 60 is supplied to the knock C/U 66 and need not be direclty taken outside so that the terminal portion 68 can be provided with a through capacitor type terminal conductive portion. By virtue of this feature, it is possible to prevent with certainty an operation of a knock control system which is disturbed by external noise, electric wave interference, etc.

As with the prior art knock control system and the embodiment illustrated in FIGS. 4–11, the position of the knock sensor on the engine block can be determined considerably freely and, for example, the knock sensor may be attached to a position in which the vibrations due to a knocking from the cylinders are transmitted to the knock sensor at substantially equal intensities between the respective cylinders. However, as readily apparent, with the embodiment of FIG. 12, the mounting position of the knock sensor is dictated by the mounting position of the distributor. Consequently, in some situations, the effectiveness of the knock sensor may be somewhat effected if the distributor is not disposed at the best position for detecting the knock vibrations of the respective cylinders. However, since the engine block and the respective cylinders are, in most cases, of a unitary construction, in practical use, problems will seldom develop except for extreme cases relating to the positioning of the distributor on the engine block thereby governing the disposition of the knock sensor. Additionally, if necessary, the processing of signals from the knock sensor may be changed or altered near the ignition timing of the respective cylinders, with such signal processing being easily carried out in an engine control system employing a microcomputer; however, as can be appreciated, such signal processing would slightly increase the overall cost of the system; however, such signal processing would not reduce or cancel the overall effectiveness of the embodiment illustrated in FIG. 12.

Additionally, with regard to the embodiment of FIG. 12, the knock C/U 66 may well be mounted outside with only the knock sensor 60 being disposed in the interior of the distributor and, needless to say, the knock sensor 60 may also take the form of the knock sensor illustrated in FIG. 2.

While we have shown and described several embodiment in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

We claim:

1. A knock control system for an internal combustion engine, the knock control system comprising a distributor means having a housing means and a base means for enabling an attachment of the distributor means to a block of the engine, means for detecting vibrations of the engine indicative of a knock condition and for converting the detected vibrations into into an electrical output signal, circuit means for processing the output signal and for providing a signal indicative of an occurrence of a knock in dependence upon the output signal from said means for detecting, and wherein said circuit means and said detection means are mounted within said distributor means.

2. A knock control system for an internal combustion engine, the knock control system comprising a distributor means having a housing means and a base means for enabling an attachment of the distributor means to a block of the engine, means for detecting vibrations of the engine indicative of a knock condition and for converting the detected vibrations into an electrical output signal, circuit means for processing the output signal and for providing a signal indicative of an occurrence of a knock in dependence upon the output signal from said means for detecting, at least one of the means for detecting and the circuit means for processing is mounted on a portion of said distributor means, and wherein a shield means is disposed in the housing means for dividing the same into an upper and lower portion, said means for detecting and said circuit means for processing are disposed in the lower portion of said housing means.

3. A knock control system according to claim 2, wherein said means for detecting includes a piezoelectric sensor means disposed in a recess means formed in the lower portion of the housing means.

4. A knock control system according to claim 3, further comprising an igniter means for providing an ignition timing output signal, said circuit means for processing includes a knock control circuit for receiving the ignition timing signal and processing the same, and wherein means are provided for electrically connecting said knock control circuit means to said piezoelectric sensor means.

5. A knock control system according to claim 4, further comprising a distributor cap means, and an ignition coil means unitarily molded in an upper part of the distributor cap means.

6. A knock control system according to claim 5, wherein both said knock control circuit and said igniter means are formed as integrated circuit units.

* * * * *